United States Patent [19]
Yang et al.

[11] Patent Number: 6,034,025
[45] Date of Patent: Mar. 7, 2000

[54] CATALYST FOR POLYMERIZATION AND COPOLYMERIZATION OF OLEFINS

[75] Inventors: Chun-Byung Yang; Mie-Ock Kim, both of Taejon, Rep. of Korea

[73] Assignee: Samsung General Chemicals, Co., Ltd., Rep. of Korea

[21] Appl. No.: 08/989,292

[22] Filed: Dec. 11, 1997

[30] Foreign Application Priority Data

May 9, 1997 [KR] Rep. of Korea ................ 97-17906
May 9, 1997 [KR] Rep. of Korea ................ 97-17907

[51] Int. Cl.⁷ .................... B01J 31/00; B01J 37/00; C08F 4/02; C08F 4/60
[52] U.S. Cl. .................. 502/126; 502/125; 502/127; 526/124.9; 526/142; 526/209; 526/212
[58] Field of Search ..................... 502/125, 126, 502/127

[56] References Cited

U.S. PATENT DOCUMENTS

| | | |
|---|---|---|
| 4,069,169 | 1/1978 | Toyoda et al. . |
| 4,071,672 | 1/1978 | Kashiwa ................................ 526/122 |
| 4,071,674 | 1/1978 | Kashiwa et al. .................. 526/125 |
| 4,076,924 | 2/1978 | Toyota et al. . |
| 4,085,276 | 4/1978 | Toyota et al. ..................... 526/122 |
| 4,107,413 | 8/1978 | Giannini et al. . |
| 4,107,414 | 8/1978 | Giannini et al. . |
| 4,156,063 | 5/1979 | Giannini et al. . |
| 4,157,435 | 6/1979 | Toyota et al. . |
| 4,187,196 | 2/1980 | Giannini et al. . |
| 4,220,554 | 9/1980 | Scatá et al. ...................... 526/125 |
| 4,226,963 | 10/1980 | Giannini et al. . |
| 4,315,835 | 2/1982 | Scatá et al. ...................... 526/125 |
| 4,315,874 | 2/1982 | Ushida et al. ..................... 264/5 |
| 4,330,649 | 5/1982 | Kioka et al. ..................... 526/125 |
| 4,336,360 | 6/1982 | Giannini et al. . |
| 4,399,054 | 8/1983 | Ferraris et al. .................. 526/125 |
| 4,401,589 | 8/1983 | Kioka et al. ..................... 252/429 |
| 4,439,540 | 3/1984 | Cecchin et al. ................... 502/125 |
| 4,806,433 | 2/1989 | Sasaki et al. .................... 502/126 |
| 4,866,022 | 9/1989 | Arzoumanidis et al. ......... 502/120 |
| 4,912,074 | 3/1990 | Miro .............................. 502/125 |
| 4,946,816 | 8/1990 | Cohen et al. ..................... 502/126 |
| 4,952,649 | 8/1990 | Kioka et al. ..................... 502/119 |
| 4,978,648 | 12/1990 | Barbe et al. ..................... 502/127 |
| 4,988,656 | 1/1991 | Arzoumanidis et al. ......... 502/127 |
| 5,013,702 | 5/1991 | Arzoumanidis et al. ......... 502/120 |
| 5,081,090 | 1/1992 | Arzoumanidis et al. ......... 502/125 |
| 5,124,297 | 6/1992 | Arzoumanidis et al. ......... 502/120 |
| 5,780,378 | 7/1998 | Toida et al. ..................... 502/126 |
| 5,817,591 | 10/1998 | Shamshoum et al. ............. 502/127 |
| 5,849,655 | 12/1998 | Shamshoum et al. ............. 502/127 |
| 5,965,478 | 10/1999 | Goto et al. ...................... 502/126 |

FOREIGN PATENT DOCUMENTS 0 602 922 6/1994 European Pat. Off. .

OTHER PUBLICATIONS

Dialog Web Search results including Patent Abstract of Belgium Patent No. BE 895019 A (1 sheet). Search Date Not Available.

Dialog Web Search results including Patent Abstract of Germany Patent No. DE 3241999 C (1 sheet). Search Date Not Available.

Dialog Web Search results including Patent Abstract of Great Britain Patent No. GB 2111066 B (1 sheet). Search Date Not Available.

Patent Abstracts of Japan as found on Dialog Web for Japanese Publication No. Sho–58–83006 published 1983.

Patent Abstracts of Japan as found on Dialog Web for Japanese Publication No. Sho–63–54004 published 1988.

*Primary Examiner*—Mark L. Bell
*Assistant Examiner*—J. Pasterczyk
*Attorney, Agent, or Firm*—Conley, Rose & Tayon

[57] ABSTRACT

A method for producing a catalyst for the polymerization or copolymerization of olefins is described. The method includes producing a magnesium compound solution by reacting a magnesium halide compound in the mixture of a cyclic ether and two alcohols with an organosilane compound. The magnesium compound solution may be reacted with a titanium halide compound such that precipitated solid components are formed. These precipitated solid components may be reacted with a titanium compound and an electron donor to produce the polymerization catalyst.

14 Claims, No Drawings

CATALYST FOR POLYMERIZATION AND COPOLYMERIZATION OF OLEFINS

FIELD OF INVENTION

The present invention relates to polymerization and copolymerization of olefins, and more particularly to a solid titanium complex catalyst supported on magnesium carriers.

BACKGROUND OF INVENTION

Up to the present many catalysts for polymerization and copolymerization of olefins along with polymerization processes have been reported. However, the properties of polymers produced by a catalyst depend greatly upon the properties of the catalyst. It is desirable to develop an improved catalyst suitable for producing a polymer having a particular required physical property.

In catalysts for gaseous polymerization control of the shapes, sizes, and the size distribution of the catalyst is very important to ensure a good commercial workability. A catalyst having smaller particle size may cause problems during its transit, so it is necessary to minimize the particle size by producing a catalyst of narrow particle size distribution. For example, in order to produce heterophasic copolymers of 1000 μm in size with high ethylene content, especially for impact resistant applications, a large catalyst particle size of about 30 μm to about 50 μm is generally required for the polymerization. Furthermore, for copolymerization of olefins, a catalyst with a greatly developed system of pores in its structure is extremely advantageous. Finally, a catalyst needs to be excellent in its mechanical properties, so as to resist wear during the polymerization process and to ensure a good bulk density of the polymer produced. The important thing in the development of a polymerization catalyst is, therefore, the provision of a process for production of a catalyst which allows control and adjustment of the structures and sizes of the catalyst's particles and particle size distribution, and yet remains a necessarily simple process.

Numerous olefin polymerization catalysts containing magnesium and based on titanium and production processes utilizing them have been reported, and these are suitable for gaseous polymerization.

Methods which make use of magnesium solutions for the production of catalysts are known. For instance, a magnesium solution may be produced by reacting a magnesium compound, in the presence of a hydrocarbon solvent, with such electron donors as alcohols, cyclic ethers, etc. Use of an alcohol as an electron donor is mentioned in U.S. Pat. No. 4,330,649 and Japanese Patent Pub. Sho 58-83006. In U.S. Pat. Nos. 4,315,874, 4,399,054, 4,071,674, and 4,439,540, methods are also reported for the production of magnesium solutions. Use of a silicon compound as a constituent of the catalyst for obtainment of solid catalyst components from magnesium solutions has been described in U.S. Pat. Nos. 4,071,672, 4,085,276, 4,220,554, 4,315,835, etc.

U.S. Pat. Nos. 4,946,816, 4,866,022, 4,988,656, 5,013,702, and 5,124,297 are all mutually related, and the processes for producing catalysts in these patents comprise (i) making a solution containing magnesium from a magnesium carboxylate or magnesium alkylcarbonate, (ii) precipitating magnesium in the presence of transition metal halide and an organosilane, (iii) reprecipitating the once precipitated solid components by the use of a mixed solution containing tetrahydrofuran, and (iv) producing a catalyst of uniform size distribution by reacting the reprecipitated particles with transition metal compounds and electron donor compounds. These processes tend to require too many steps in the production of the catalyst. These processes also tend to involve production processes which are themselves a little too complicated.

Japanese Patent Publication Sho 63-54004 and U.S. Pat. No. 4,330,649 describe processes in which the magnesium solution is produced by reacting a magnesium compound with more than one member of the group consisting of alcohol, organic carboxylic acid, aldehyde, and amine in the presence of an organic hydrocarbon solvent, with the final catalytic component being produced by reaction of the above solution with titanium compounds and an electron donor. Organosilane, mentioned as a shape-controlling agent in the patents cited above, has often been used in the process of production of solid catalysts. Use of this shape-controlling agent is helpful in adjusting the particle size distribution of catalysts by restraining generation of either very small or very large granules. Such an organosilane is a material represented by a general formula, $R_n SiR'_{4-n}$ (n=0, 1, 2, 3, or 4), in which R represents a hydrogen, alkyl, alkoxy, haloalkyl, or aryl group having from one to 10 carbon atoms; R' represents OR or halogen. Examples of organosilanes include trimethylchlorosilane, trimethylethoxysilane, dimethyldichlorosilane, tetraethoxysilane, tetrabutoxysilane, and others. To our knowledge, no prior art has been reported that organosilanes were applied for the purpose of increasing the porosity of catalysts.

SUMMARY OF INVENTION

The present invention utilizes a mixture of cyclic ether and two or more kinds of alcohol in the production of the catalyst, as well as organosilane for control of porosity.

In an embodiment a catalyst for polymerization and copolymerization of olefins, which is produced by a simple process and yet has high polymerization activity and good particle regularity, the particles/being well adjusted in their size distribution is described.

In another embodiment, a catalyst for polymerization and copolymerization of olefins, wherein both the average size of the granules and their porosity are large is described.

In another embodiment a catalyst for production of an ethylene/propylene copolymer having a high ethylene content and high melting indices is described.

Yet another objective of the present invention is to provide a simple process for producing a catalyst having a specific size, shape and porosity well suited to the desired polymer to be produced.

The usefulness of the present invention will become more obvious and definite through the following explanation, the examples, and the claims of the present invention.

DETAILED DESCRIPTION OF THE INVENTION

In an embodiment olefin polymerization and copolymerization using a solid titanium complex catalyst may be achieved. The catalyst may be produced by a simple yet efficacious method comprising three steps: (i) producing a solution containing magnesium (a magnesium compound solution) from a magnesium halides compound; (ii) precipitating the solid components by reacting said magnesium compound solution with a transition metal compound; and (iii) reacting the precipitated solid components with a transition metal compound again in the presence of an internal electron donor. As will be detailed below, the magnesium halide compound solution maybe made by dissolving a non-reductive magnesium halide compound in a solvent made from a mixture of a cyclic ether and two or more kinds of alcohol, in the presence or absence of a hydrocarbon solvent and, if desired, by subsequently adding an organosilane.

Examples of magnesium halide compounds used in step (i) above include such magnesium dihalides as magnesium chloride, magnesium iodide, magnesium fluoride, and magnesium bromide; such alkylmagnesium halides as methylmagnesium halide, ethylmagnesium halide, propylmagnesium halide, butylmagnesium halide, isobutylmagnesium halide, hexylmagnesium halide, amylmagnesium halide; such alkoxymagnesium halides as methoxymagnesium halide, ethoxymagnesium halide, isopropoxymagnesium halide, butoxymagnesium halide, and octoxymagnesium halide; such aryloxymagnesium halides as phenoxymagnesium halide and methylphenoxymagnesium halide; Such magnesium compounds can also be effective when used in the form of complex compounds with other metals.

In another embodiment, the magnesium compound may be obtained from the reaction of magnesium compounds with polysiloxane compounds, silane compounds containing halogen, ester, alcohol, etc. The preferable magnesium compounds are magnesium halides, especially magnesium chloride and alkylmagnesium chloride, in which the alkyl group preferably has from one to ten carbon atoms; alkoxymagnesium chloride, in which the alkoxy group preferably has from one to ten carbon atoms; and aryloxymagnesium chloride, in which the aryloxy group preferably has from six to twenty carbon atoms.

In step (i), the magnesium compound solution may be produced by dissolving the aforesaid magnesium halide compounds in a solvent of a mixture of two or more kinds of alcohol and cyclic ether either in the presence or absence of a hydrocarbon solvent. The hydrocarbon solvents used at this stage include such aliphatic hydrocarbons as pentane, hexane, heptane, octane, decane, and kerosene; such cycloaliphatic hydrocarbons as cyclobenzene, methylcyclobenzene, cyclohexane, and methylcyclohexane; such aromatic hydrocarbons as benzene, toluene, xylene, ethylbenzene, cumene, and cymene; such halogenated hydrocarbons as dichloropropane, dichloroethylene, trichloroethylene, carbon tetrachloride, and chlorobenzene.

When producing a magnesium halide compound solution, a mixture of two or more kinds of alcohol and cyclic ether may be used as a solvent. By the use of such a mixed solvent, magnesium compounds may be more easily turned into a solution than by the use of any one single solvent. Alcohols which may be used to produce a magnesium halide compound solution include, but are not limited to, methanol, ethanol, propanol, butanol, pentanol, hexanol, octanol, decanol, dodecanol, octadecylalcohol, benzilalcohol, phenylalcohol, isopropylbenzilalcohol, and cumyl alcohol. In general, useful alcohols include all alcohols that contain from one to 20 carbon atoms, the more preferable being those containing one to 12 carbon atoms. For cyclic ethers, tetrahydrofuran, 2-methyl tetrahydrofuran, tetrahydropyran may be used, but the preferable cyclic ether is tetrahydrofuran. The total quantity of the cyclic ether and alcohol for use here is at least 0.5 mol per 1 mol of magnesium compound, preferably about 1~20 mol, more preferably about 2~10 mol, while the mol ratio of the cyclic ether and the alcohol is preferably between 1: 0.05 to 1: 0.95.

The entire alcohol mixture may all be used in dissolving the magnesium halide compound. Alternatively, a part of the alcohol mixture may be used in dissolving the magnesium compound, while the remaining part may be added to the magnesium solution obtained by dissolving the magnesium compound.

In particular, the alcohol mixture includes one alcohol of relatively lower molecular weight having from one to three carbon atoms and a second alcohol of relatively higher molecular weight having four to 20 carbon atoms. The molar ratio of the alcohol of relatively lower molecular weight to the alcohol of relatively higher molecular weight is from 1:0.01 to 1:0.40, preferably from 1:0.01 to 1:0.25. In one embodiment, the alcohol of relatively lower molecular weight is methanol or ethanol, and the alcohol of relatively higher molecular weight is butanol, isoamyl alcohol, or 2-ethyl hexanol.

The advantages of using two or more kinds of alcohol, are (1) easy conversion of a magnesium halide compound into a magnesium halide compound solution, (2) decrease in the number of catalytic particles which are too small, and (3) production of a catalyst having a large average particles size and a narrow particles distribution.

The reaction of the magnesium compound and a mixture of cyclic ether and two or more kinds of alcohol for production of the magnesium compound solution may be performed at a temperature of at least about −25° C., preferably at −10° C. to 200° C., most preferably from 0° C. to 160° C. for from 16 minutes to five hours, preferably for 30 minutes to three hours in the presence of a hydrocarbon solvent. The conditions for the reaction depend on the kinds and amounts of the cyclic ether and alcohols in use.

The organosilane which can be added at the time of production of the magnesium halide compound solution may be represented by the general formula $R_nSiR'_{4-n}$ (here, R represents hydrogen, an alkyl, haloalkyl or aryl group having one to 10 carbon atoms, or a halosilyl or halosilylalkyl group having one to 8 carbon atoms, R' representing OR or halogen, and n=0, 1, 2, 3, or 4).

By adding organosilanes during the production of a magnesium halide compound solution, the porosity of the catalyst may be increased.

The magnesium halide compound solution may be crystallized into a solid form by reacting the magnesium halide compound solution with a transition metal compound, e.g. a titanium compound in liquid form. This transition metal compound may be represented by a general formula: $Ti(OR)_aX_{4-a}$ (R being a hydrocarbon group, X halogen atoms, "a" the number $0 \leq a \leq 4$). In an embodiment, R is an alkyl group having one to 10 carbon atoms. The kind of titanium compounds to satisfy the above formula may include, for example, such titanium tetrahalides as $TiCl_4$, $TiBr_4$, $TiI_4$; such trihalo alkoxytitanium compounds as $Ti(OCH_3)Cl_3$, $Ti(OC_2H_5)Cl_3$, $Ti(OC_2H_5)Br_3$, and $Ti(O(i-C_4H_9)Br_3$; such dihalo alkoxytitanium compounds as $Ti(OCH_3)_2Cl_2$, $Ti(OC_2H_5)_2Cl_2$, $Ti(O(i-C_4H_9)_2Cl_2$ and $Ti(OC_2H_5)_2Br_2$; such tetraalkoxytitanium as $Ti(OCH_3)_4$, $Ti(OC_2H_5)_4$, and $Ti(OC_4H_9)_4$. Mixtures of these titanium compounds may also be used. The preferable titanium compounds are titanium compounds containing halogen, and the most preferable is titanium tetrachloride.

The quantity of the titanium compounds, silicon compounds, tin compounds, or their mixtures, used when crystallizing the magnesium compound solution is appropriately 0.1 mol to 200 mol to 1 mol of the magnesium compound, preferably 0.1 mol to 100 mol, and most preferably 0.2 mol to 80 mol. The shape and size of the crystallized solid components, as well as their particle size distribution, depend upon the conditions of the reaction of the magnesium compound solution with the titanium compounds, and thus can be varied as desired for the specific application. The reaction of the magnesium compound solution with titanium compounds, may be performed at sufficiently low temperatures such that the solid matter gradually crystallizes.

Preferable temperatures are −70° C. to 70° C. for a contact reaction, more preferably −50° C. to 50° C. After the contact reaction, the temperature in the preferred embodiment is raised and the reaction left to continue at 50° C. to 150° C. for 0.5 hours to five hours.

In Step (iii), the solid components may be reacted with transition metal compounds in the presence of a proper internal electron donor to produce a catalyst. This reaction may proceed in two phases. The first phase is reacting the solid components with either a titanium compound alone or a titanium compound and internal electron donor together. The second phase is separating the solid components and reacting them with a titanium compound and an internal electron donor, separating the solid components, and drying them, thereby obtaining the desired catalyst. In alternative embodiment the solid components obtained in Step (ii) may be reacted with a titanium compound either in the presence or absence of hydrocarbon or halogenated hydrocarbon for a certain length of time and then adding an internal electron donor thereto afterwards.

The transition metal compounds adequate for use in Step (iii) above are titanium compounds, especially titanium halides and such haloalkoxy titaniums whose alkoxy functional group has one to 20 carbon atoms, or mixtures thereof Preferable among these are titanium halides or halogenated alkoxytitanium in which the functional group has one to eight carbon atoms. Most preferable is titanium tetrahalide.

The internal electron donors adequate for use in step (iii) above include compounds containing oxygen, nitrogen, sulphur, and phosphorus. Examples of such compounds include organic acids, organic acid esters, alcohols, ethers, aldehydes, ketones, amines, amine oxides, amides, phosphoric acid esters, and their mixtures. Especially preferable as an internal electron donor are the aromatic esters. Benzoic acid alkyl esters and halobenzoic acid esters such as methyl benzoate, methyl bromobenzoate, ethyl benzoate, ethyl chlorobenzoate, ethylbromo benzoate, butyl benzoate, isobutyl benzoate, hexyl benzoate, and cyclohexyl benzoate; and such dialkylphthalates as diisobutylphthalate, diethylphthalate, ethylbutylphthalate, dibutylphthalate which have two to 10 carbon atoms are also usable. These internal electron donors may also be used in a mixture of two or more. Also, they are usable in the form of an additive to other compounds, or in a complex with other compounds. The quantity of these internal electron donors, in use, can vary: about 0.01 mol to 10 mol to 1 mol of the magnesium compound, preferably 0.01 mol to 5 mol, and most preferably 0.05 mol to 2 mol.

The solid titanium complex catalyst produced by the method described above may be utilized in the polymerization of such olefins as ethylene and propylene. The catalyst may be used for the polymerization of α-olefins having more than three carbon atoms such as propylene, 1-butene, 1-pentene, 4-methyl-1-pentene, 1-hexene; copolymerization between these; copolymerization of propylene and ethylene or other α-olefins of less than 20 mol; and copolymerization of polyunsaturated compounds like conjugated or nonconjugated dienes.

The polymerization and copolymerization of olefins may be performed with the use of a catalyst system that includes (a) the solid titanium complex catalyst, produced according to the method described herein, as the main catalyst, (b) organometallic compounds as a cocatalyst, and (c) organosilicon compounds, particularly dicyclopentyldimethoxysilane or diisobutyldimethoxysilane, as an external electron donor.

The solid titanium complex catalyst component (a) may also be preliminarily polymerized with an olefin, before being put to use for the reaction for polymerization. This preliminary polymerization may be performed by reacting the aforesaid catalyst component with organoaluminum compounds like triethylaluminum in the presence of a hydrocarbon solvent such as hexane at sufficiently low temperature and pressurized by α-olefin in the presence or absence of electron donors constituted of organosilicon compounds. Preliminary polymerization of the catalyst, by encircling the catalyst granules with polymers and thereby maintaining the shape of the catalysts, allows the production of a better-shaped polymer. Activity of the catalyst or evenness of its granules also improves. The ratio in weight of polymer to catalyst after the preliminary polymerization is generally from 0.1:1 to 20:1.

An organometallic compound (b) useful in the process of polymerization of an olefin may be represented by a general formula of $MR_n$, wherein M represents metallic components such as belong to Group II or IIIA of the periodic table of elements (e.g. magnesium, calcium, zinc, boron, aluminum, gallium, etc.), R represents an alkyl group having one to 20 carbon atoms (such as a methyl, ethyl, butyl, hexyl, octyl, or decyl group), while n represents the valence of the metallic components. As the most preferable organometallic compound, a trialkyl aluminum like triethyl aluminum and triisobutyl aluminum having one to six carbon atoms or their mixtures can be used. At times, organoaluminum compounds having one or more halogen or hydride groups such as ethylaluminum dichloride, diethylaluminum chloride, ethylaluminum sesquichloride, diisobutylaluminum hydride can also be used.

In the present invention, as the external electron donors (c) such organosilicon compounds as diphenylmethoxysilane, phenyltrimethoxysilane, phenylethyldimethoxysilane, phenylmethyldimethoxysilane, isobutyltrimethoxysilane, diisobutyldimethoxysilane, diisopropyldimethoxysilane, di-t-butylmethoxysilane, t-butyltrimethoxysilane, cyclohexylmethyldimethoxysilane, dicyclopentyldimethoxysilane, dicyclohexyldimethoxysilane, 2-norbornanetriethoxysilane, 2-norbornanemethyldimethoxysilane, and a mixture thereof can be used.

The polymerization can be performed by gas or bulk polymerization methods in the absence of organic solvents, or else by liquid slurry polymerization methods in the presence of an organic solvent. Polymerization is performed in the absence of oxygen, water, or other chemical compounds which may act as a catalyst poison. In the case of liquid slurry polymerization the preferable concentration of solid titanium complex catalyst (a) is, in terms of the titanium atoms in the catalyst, from 0.001 mmol to 5 mmol per one liter of the solvent, preferably 0.001 mmol to 0.5 mmol. For the solvents such alkanes as pentane, hexane, heptane, n-octane, and isooctane, cyclohexane, and methylcyclohexane, and such alkylaromatics as cycloalkane, toluene, xylene, ethylbenzene, isopropylbenzene, ethyltoluene, n-propylbenzene, and diethylbenzene, and such aromatic halides as chlorobenzene, chloronaphthalene, and orthodichlorobenzene, and also their mixtures are useful. In the case of gas polymerization, the quantity of the solid titanium complex catalyst (a) is, in terms of the titanium atoms in the catalyst, from 0.001 mmol to 5 mmol per one liter of the object of polymerization, preferably 0.001 mmol to 1.0 mmol, and most preferably 0.01 mmol to 0.5 mmol.

The preferable concentration of the organometallic compound (b), in terms of aluminum atoms, is from 1 mol to 2000 mol per one mol of titanium atoms in the catalyst (a), preferably about 5 mol to 500 mol; while the preferable concentration of the organosilicon compound (c), in terms of silicon atoms, is from 0.001 mol to 40 mol per one mol of the aluminum atoms in the organometallic compound (b), preferably about 0.06 mol to 30 mol.

In order to secure a high rate of polymerization, the reaction may take place at high temperatures regardless of polymerization method. Generally, temperatures between 20° C. and 200° C. are adequate, preferably between 20° C. and 95° C. The monomer's pressure at the time of polymerization is appropriately between the ambient pressure and 100 atmospheres of pressure, more appropriately two to 50 atmospheres of pressure.

In the present invention additives can be used at times in order to adjust the molecular weights in the polymer produced. A usual additive is hydrogen, and use of this can be decided upon in the way generally known in the field.

The polymer produced by the above-described process is typically a solid isotactic poly α-olefin, and it has several advantages: the yield of polymer is sufficiently high that there is no need for removal of the residues of the catalyst, and the stereo regularities are excellent and so spare the trouble of deliberately removing irregular polymers.

The present invention is described in detail, reference being made to the examples of embodiment and the examples of comparison. Notwithstanding this, the scope of the present invention is not confined to these examples alone. Other equivalent embodiments are possible without departing the scope of the present invention. The invention has been disclosed in detail to allow enablement, but nothing in this disclosure limits or changes the scope of the claims of this invention.

EXAMPLE 1

The solid titanium complex catalyst used in the process for polymerization of an olefin was produced through the three steps given below:

Step (i)
Production of the Magnesium Compound Solution

In a 1.0 L reactor equipped with a mechanical stirrer, filled with a nitrogenous atmosphere, a mixture of 15 g of $MgCl_2$ and 450 ml of toluene was poured. It was stirred at 400 rpm. Then 30 ml of tetrahydrofuran, 28 ml of butanol and 0.4 ml of methanol were added thereto, the temperature was raised to 105° C., and the mixture was left to react for three hours. The resulting homogeneous solution was cooled to ambient temperature.

Step (ii)
Production of the Solid Components

The aforesaid magnesium solution was transferred to a 1.6 L reactor kept at 15° C.~35° C. It was stirred at 350 rpm, and to it 20 ml of $TiCl_4$ was added, and the temperature of the reactor was raised to 90° C. During the process the solid components formed. The reaction was allowed to continue at 90° C. for an hour, then stirring was stopped and the formed solid components were left to settle down. The supernatant was separated and the remaining solid components were washed twice with 75 ml of toluene each wash.

Step (iii)
Production of the Catalyst

To the previously produced solid components 100 ml of toluene and 100 ml of $TiCl_4$ were added. After the temperature of the reactor was raised to 110° C., stirring was continued for one hour. At the end of the hour, stirring was stopped, the solid components left to settle down, and the supernatant separated. To the solid components 100 ml of toluene and 100 ml of $TiCl_4$ were added, and at 70° C. 2.9 ml of diisobutyl phthalate was added thereto.

After the temperature of the reactor was raised to 115° C., stirring was continued for a further one hour. Stirring was stopped, the supernatant separated, 100 ml of toluene added, the temperature of the reactor lowered to 70° C., and stirring was resumed for another half an hour. After reaction, the stirring was ceased, the supernatant separated, 100 ml of $TiCl_4$ added, stirring resumed and continued at 70° C. for a final half an hour. The catalyst produced this way was washed five times with 75 ml of refined hexane each wash. The catalyst then was dried in a nitrogen atmosphere and stored away.

The particle size distribution of the catalyst was measured by the use of a laser analyzer (Mastersizer X, Malvern Instruments), the results indicating a distribution of $d_{10}$=31.4 μm, $d_{50}$=52.9 μm, $d_{90}$=87.1 μm, signifying that 10%, 50%, and 90% of the particles are respectively smaller than 31.4 μm, 52.9 μm, and 87.1 μm. Note that $d_{50}$ shows the median size of these particles.

Polymerization

A two-liter reactor was dried in an oven and assembled in a heated condition, and a vial containing 38 mg of the catalyst was set in the reactor. The inside of the reactor was filled with a nitrogen atmosphere by application alternately of nitrogen and vacuum three times. Then 1000 ml of n-hexane was put in the reactor, and afterwards 10 mmol of triethylaluminum and, as an external electron donor, 1.0 mmol of cyclohexylmethyldimethoxysilane. After applying 20 psi of propylene pressure, and breaking the vial of the catalyst with the agitator, polymerization was performed at ambient temperature for five minutes, stirring continuing at 630 rpm. 100 ml of hydrogen was added, the temperature of the reactor raised to 70° C., and the pressure of the propylene was adjusted to 100 psi, while polymerization was continued for an hour. After the polymerization was finished, the temperature of the reactor was lowered to ambient temperature, and excess ethanol solution was added. The polymer thus produced was collected separately, and dried in a vacuum oven at 50° C. for six hours, to obtain polypropylene in the form of a white powder.

The polymerization activity (kg polypropylene to g catalyst) was 3.6, while the granular regularity (%) of the polymer, indicated by the percentage of the weight (g) of the polymer which was not extracted in boiling n-heptane in six hours, was 97.2%. The bulk density (g/ml) of the polymer was 0.40.

EXAMPLE 2

The catalyst was produced as in Example 1 but using 30 ml of tetrahydrofuran, 28 ml of butanol, and 2.0 ml of ethanol for preparing the magnesium compound solution in Step (i) of Example 1, and the polymerization reaction was also performed in the same way as in Example 1.

The particle size distribution of the thus produced catalyst was $d_{10}$=28.9 μm, $d_{50}$=49.3 μm, $d_{90}$=93.7 μm, while the polymerization activity was 2.8 Kg polypropylene/g catalyst, the granular regularity of the polymer was 97.1%, and bulk density of the polymer was 0.40 g/ml.

EXAMPLE 3

The catalyst was produced as in Example 1 but using 30 ml of tetrahydrofuran, 45 ml of 2-ethyl-1-hexanol, and 2.0 ml of ethanol for preparing the magnesium compound solution in Step (i) of Example 1, and the polymerization reaction was also performed in the same way as in Example 1.

The particle size distribution of the thus produced catalyst was $d_{10}$=19.8 μm, $d_{50}$=45.2 μm, $d_{90}$=93.6 μm, while the polymerization activity was 1.6 Kg polypropylene/g catalyst, the granular regularity of the polymer was 96.5%, and the bulk density of the polymer was 0.38 g/ml.

EXAMPLE 4

The catalyst was produced as in Example 1 except that the homogeneous solution finally obtained for preparing the magnesium compound solution in Step (i) of Example 1 was cooled to the ambient temperature, 3.2 ml of silicon tetraethoxide was added thereto, and it was stirred for longer than 0.5 hour, while the polymerization reaction was also performed in the same way as in Example 1.

The particle size distribution of the thus produced catalyst was $d_{10}$=31.2 μm, $d_{50}$=51.9 μm, $d_{90}$=92.7 μm, while the total pore volume (ml/g) measured using a mercury porosimeter (Micromeritics, Autopore II 9220) of the catalyst was 1.54 ml/g, the polymerization activity was 4.8 kg polypropylene/g catalyst, the granular regularity of the polymer was 97.3%, and the bulk density of the polymer was 0.33 g/ml.

EXAMPLE 5

The catalyst was produced as in Example 4 except that 30 ml of tetrahydrofuran, 28.0 ml of butanol, 0.6 ml of ethanol, and 3.2 ml of silicontetraethoxide were used for preparing the magnesium compound solution, and the polymerization reaction was also performed in the same way as in Example 4.

The particle size distribution of the thus produced catalyst was $d_{10}$=32.9 μm, $d_{50}$=56.3 μm, $d_{90}$=94.7 μm, while the total pore volume of the catalyst was 1.76 ml/g. The polymerization activity was 5.1 kg polypropylene/g catalyst, the steroregulanity granular regularity of the polymer was 97.1%, and the bulk density of the polymer was 0.32/ml.

EXAMPLE 6

The catalyst was produced as in Example 4 except that 30 ml of tetrahydrofuran, 28.0 ml of butanol, 0.4 ml of ethanol, and 5.1 ml of silicontetrabutoxide were used for preparing the magnesium compound solution, and the polymerization reaction was also performed in the same way as in Example 4.

The particle size distribution of the thus produced catalyst was $d_{10}$=26.4 μm, $d_{50}$=53.2 μm, $d_{90}$=89.8 μm, while the total pore volume of the catalyst was 1.76 ml/g. The polymerization activity was 3.2 Kg polypropylene/g catalyst, the granular regularity of the polymer was 97.1%, and the bulk density of the polymer was 0.35 g/ml.

EXAMPLE 7

The catalyst was produced as in Example 4 except that 30 ml of tetrahydrofuran, 28 ml of butanol, 0.6 ml of ethanol, and 5.1 ml of silicontetrabutoxide were used for preparing the magnesium compound solution, and the polymerization reaction was also performed in the same way as in Example 4.

The particle size distribution of the thus produced catalyst was $d_{10}$=27.4 μm, $d_{50}$=57.2 μm, $d_{90}$=95.8 μm, while the total pore volume of the catalyst was 1.57 ml/g. The polymerization activity was 3.4 Kg polypropylene/g catalyst, the granular regularity of the polymer was 97.6%, and the bulk density of the polymer was 0.35 g/ml.

EXAMPLE 8

The catalyst was produced as in Example 4 except that 30 ml of tetrahydrofuran, 28 ml of butanol, 0.6 ml of ethanol, and 1.6 ml of silicontetraethoxide were used for preparing the magnesium compound solution, and the polymerization reaction was also performed in the same way as in Example 4.

The particle size distribution of the thus produced catalyst was $d_{10}$=31.1 μm, $d_{50}$=54.8 μm, $d_{90}$=96.8 μm, while the total pore volume of the catalyst was 1.52 ml/g. The polymerization activity was 4.3 kg polypropylene/g catalyst, the granular regularity of the polymer was 97.7%, and the bulk density of the polymer was 0.34 g/ml.

EXAMPLE 9

The catalyst was produced as in Example 4 except that 30 ml of tetrahydrofuran, 28 ml of butanol, 0.6 ml of ethanol, and 4.8 ml of silicontetraethoxide were used for preparing the magnesium compound solution, and the polymerization reaction was also performed in the same way as in Example 4.

The particle size distribution of the thus produced catalyst was $d_{10}$=31.4 μm, $d_{50}$=68.1 μm, $d_{90}$=92.6 μm, while the total pore volume of the catalyst was 1.8 ml/g. The polymerization activity was 5.2 Kg polypropylene/g catalyst, the granular regularity of the polymer was 97.4%, and the bulk density of the polymer was 0.31 g/ml.

Comparative Example 1

A magnesium compound solution was produced as in Example 1, except without the use of methanol at the time of producing the magnesium compound solution and it was used for production of the catalyst as in Example 1, while the polymerization reaction was performed in the same way as in Example 1.

The particle size distribution of the thus produced catalyst was $d_{10}$=17.8 μm, $d_{50}$=33.2 μm, $d_{90}$=73.7 μm. The polymerization activity was 2.2 Kg polypropylene/g catalyst, the granular regularity of the polymer was 97.1%, and the bulk density of the polymer was 0.38 g/ml.

Comparative Example 2

A magnesium compound solution was produced as in Example 4, except without the use of silicontetraethoxide at the time of producing a magnesium compound solution and it was used for production of the catalyst as in Example 4, while the polymerization reaction was performed in the same way as in Example 4.

The particle size distribution of the thus produced catalyst was $d_{10}$=30.6 μm, $d_{50}$=56.1 μm, $d_{90}$=89.7 μm, while the total pore volume of the catalyst was 1.14 ml/g. The polymerization activity was 2.3 Kg polypropylene/g catalyst, the granular regularity of the polymer was 96.9%, and the bulk density of the polymer was 0.39 g/ml.

Comparative Example 3

A magnesium compound solution was produced as in Example 5, except without the use of silicontetraethoxide at the time of producing a magnesium compound solution as in Example 5, and it was used for production of the catalyst while the polymerization reaction was performed in the same way as in Example 5.

The particle size distribution of the thus produced catalyst was $d_{10}$=32.7 μm, $D_{50}$=54.3μ, $d_{90}$=89.3μ, while the total pore volume of the catalyst was 1.17 ml/g. The polymerization activity was 3.4 Kg polypropylene/g catalyst, the granular regularity of the polymer was 97.6%, and the bulk density of the polymer was 0.42 g/ml.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A catalyst for polymerization or copolymerization of olefins, which is produced by the method comprising:
   i) producing a magnesium compound solution by dissolving a magnesium halide compound in a mixture of a cyclic ether and at least two different alcohols to form an intermediate solution and adding an organosilane compound to the intermediate solution to form the magnesium compound solution;
   ii) precipitating solid components by reacting said magnesium compound solution with a titanium halide compound; and,
   iii) reacting said precipitated solid components with a titanium compound and an electron donor.

2. The catalyst of claim 1, wherein the magnesium halide comprises magnesium chloride, and wherein the cyclic ether comprises tetrahydrofuran, and wherein the alcohols comprise butanol and ethanol, and wherein the organosilane compound comprises silicon tetrabutoxide, and wherein the titanium halide comprises titanium tetrachloride, and wherein the electron donor comprises diisobutyl phthalate.

3. The catalyst of claim 1, wherein said organosilane compound is represented by a general formula, $R_n SiR'_{4-n}$, wherein R represents a hydrogen, an alkyl, a haloalkyl, an aryl, a halosilyl, or a halosilylalkyl group, wherein the alkyl, the haloalkyl and the aryl groups have from one to ten carbon atoms; and wherein the halosilylalkyl groups have from one to eight carbon atoms; and wherein R' represents —OR or halogen; and wherein n=0,1,2,3, or 4.

4. The catalyst of claim 1, wherein said cyclic ether has from two to sixteen carbon atoms and said alcohols have from one to twenty carbon atoms.

5. The catalyst of claim 1, wherein the molar ratio of the magnesium in said magnesium compound solution to said mixture of said cyclic ether and said alcohols is from 1:0.5 to 1:20; and the molar ratio of said cyclic ether to said alcohols is from 1:0.05 to 1:0.95.

6. The catalyst of claim 1, wherein said alcohols used at the time of production of said magnesium compound solution comprise a first alcohol of lower molecular weight having from one to three carbon atoms and a second alcohol of higher molecular weight having from four to twenty carbon atoms, and wherein the molar ratio of the first alcohol to the second alcohol ranges from about 1:0.01 to about 1:0.4.

7. The catalyst of claim 6, wherein said cyclic ether comprises tetrahydrofuran, said first alcohol comprises methanol or ethanol, and said second alcohol comprises butanol, isoamyl alcohol, or 2-ethylhexanol.

8. The catalyst of claim 1, wherein said magnesium halide compound comprises a magnesium dihalide, an alkylmagnesium halide comprising an alkyl group which has from one to ten carbon atoms, an alkoxymagnesium halide comprising an alkoxy group which has from one to ten carbon atoms, an aryloxymagnesium halide comprising an aryloxy group which has from six to twenty carbon atoms, and mixtures thereof.

9. The catalyst of claim 1, wherein said magnesium halide compound comprises magnesium chloride.

10. The catalyst of claim 1, wherein said titanium halide compound comprises titanium tetrachloride.

11. The catalyst of claim 1, wherein said electron donor comprises an aromatic ester.

12. The catalyst of claim 1, wherein said electron donor comprises a dialkylphthalate.

13. The catalyst of claim 1, wherein the magnesium halide comprises magnesium chloride, and wherein the cyclic ether comprises tetrahydrofuran, and wherein the alcohols comprise butanol and methanol, and wherein the organosilane compound comprises silicon tetraethoxide, and wherein the titanium halide comprises titanium tetrachloride, and wherein the electron donor comprises diisobutyl phthalate.

14. The catalyst of claim 1, wherein the magnesium halide comprises magnesium chloride, and wherein the cyclic ether comprises tetrahydrofuran, and wherein the alcohols comprise butanol and ethanol, and wherein the organosilane compound comprises silicon tetraethoxide, and wherein the titanium halide comprises titanium tetrachloride, and wherein the electron donor comprises diisobutyl phthalate.

* * * * *